US011910901B2

(12) United States Patent
Kindermann

(10) Patent No.: US 11,910,901 B2
(45) Date of Patent: Feb. 27, 2024

(54) HAIR REMOVAL APPARATUS

(71) Applicant: KONINKLIJKE PHILIPS N.V., Eindhoven (NL)

(72) Inventor: Sebastian Alexander Kindermann, Burgstall (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 495 days.

(21) Appl. No.: 16/926,815

(22) Filed: Jul. 13, 2020

(65) Prior Publication Data

US 2020/0337432 A1 Oct. 29, 2020

Related U.S. Application Data

(63) Continuation of application No. 15/534,585, filed as application No. PCT/EP2015/079182 on Dec. 10, 2015, now Pat. No. 10,736,396.

(30) Foreign Application Priority Data

Dec. 18, 2014 (EP) .................................... 14198808

(51) Int. Cl.
*A45D 26/00* (2006.01)
*B26B 19/14* (2006.01)
*B26B 19/38* (2006.01)

(52) U.S. Cl.
CPC ......... *A45D 26/0028* (2013.01); *A45D 26/00* (2013.01); *B26B 19/141* (2013.01); *B26B 19/388* (2013.01); *A45D 2026/0085* (2013.01)

(58) Field of Classification Search
CPC ................ A45D 26/00; A45D 26/0023; A45D 26/0028; A45D 26/0033; A45D 26/0047;
(Continued)

(56) References Cited

U.S. PATENT DOCUMENTS 5,494,485 A 2/1996 Gabion
5,857,903 A * 1/1999 Ramspeck ......... A45D 26/0028 452/82

(Continued)

FOREIGN PATENT DOCUMENTS

CN 101434073 5/2009
DE 19745877 4/1999

(Continued)

OTHER PUBLICATIONS

English Machine Translation of WO-20100066966 (of record) (Year: 2010).*

*Primary Examiner* — Darwin P Erezo
*Assistant Examiner* — Christian D Knauss

(57) ABSTRACT

A hair-removal apparatus is provided that comprises a hair-removal device with a movable hair-removal component, which comprises at least a first hair-contacting member and a second hair-contacting member, which are movable relative to each other and which are configured and arranged to mutually co-operate for removing hairs by mutually exerting a contact force, a pressing component configured and arranged to generate said contact force by exerting a pressing force on the movable hair-removal component during operation, a skin proximity sensing component, and a force adjusting component. The skin proximity sensing component is configured and arranged to detect a relative distance between the movable hair-removal component and a portion of the skin with hairs to be removed. The force adjusting component is configured and arranged to adjust, during operation, the pressing force exerted by the pressing component in dependence on the relative distance detected by the skin proximity sensing component.

12 Claims, 6 Drawing Sheets

(58) Field of Classification Search
CPC ............ A45D 26/0052; A45D 26/0061; B26B 19/02; B26B 19/046; B26B 19/14; B26B 19/20; B26B 19/205; B26B 19/3846; B26B 19/388
See application file for complete search history.

(56) References Cited

U.S. PATENT DOCUMENTS

| | | | |
|---|---|---|---|
| 6,306,148 B1 | 10/2001 | Knesch | |
| 6,322,569 B1 | 11/2001 | Sueyoshi | |
| 10,736,396 B2 * | 8/2020 | Kindermann | ......... B26B 19/388 |
| 2001/0051808 A1 | 12/2001 | Dolev | |
| 2004/0098862 A1 | 5/2004 | Orloff | |
| 2005/0216035 A1 | 9/2005 | Kraus | |
| 2009/0240260 A1 | 9/2009 | Yang | |
| 2011/0197726 A1 | 8/2011 | Kraus | |

FOREIGN PATENT DOCUMENTS

| | | | |
|---|---|---|---|
| FR | 2673084 | 8/1992 | |
| FR | 2684856 | 6/1993 | |
| WO | 2010066966 | 6/2010 | |
| WO | WO-2010066966 A1 * | 6/2010 | ......... A45D 26/0023 |
| WO | 2014041490 | 3/2014 | |

* cited by examiner

HAIR REMOVAL APPARATUS

CROSS-REFERENCE TO RELATED APPLICATIONS

The present application is a continuation application under 37 C.F.R. § 1.53(b) of U.S. patent application Ser. No. 15/534,585 filed on Jun. 9, 2017, which is the U.S. National Phase application, under 35 U.S.C. § 371 of International Application No. PCT/EP2015/079182, filed on Dec. 10, 2015, which claims the benefit of European Application No. 14198808.9 filed on Dec. 18, 2014. Priority under 35 U.S.C. § 120 is claimed from U.S. patent application No. of U.S. patent application Ser. No. 15/534,585, and the entire disclosures of U.S. patent application No. of U.S. patent application Ser. No. 15/534,585, No. PCT/EB2015/079182 and International Application No. 14198808.9 are specifically incorporated herein by reference.

FIELD OF THE INVENTION

The present invention relates to hair removal, and relates in particular to a hair-removal apparatus.

BACKGROUND OF THE INVENTION

Hair-removal apparatuses, such as epilators, shavers, or trimmers, are used for removing hair on body surfaces. For such hair removal, electric hair removal apparatuses are widely used, for example, operated by integrated batteries, such as rechargeable batteries. WO 2014/041490 A1 relates to a motor-driven epilating device with a rotary tweezer portion for pinching, pulling and releasing hairs. Besides costs, noise level is another aspect that is important for user acceptance.

US 2005/0216035 A1 discloses a hair-removing device with a main body, a support member supporting two hair-removal units, and a positioning device for positioning the support member with the hair-removal units relative to the skin. The hair-removing device comprises sensor means to detect contact between each of the hair-removal units and the skin. When the sensor means detects contact between only one of the hair-removal units and the skin, the positioning device rotates the support member relative to the main body to such an extent that both hair-removal units are in contact with the skin. For this purpose, the positioning device comprises a control unit which receives input signals from the sensor means and controls an actuator of the positioning device in dependence on the input signals.

SUMMARY OF THE INVENTION

There may be a need to provide a hair-removal apparatus with improved user acceptance.

The object of the present invention is achieved by the subject matter of the independent claim, wherein further embodiments are incorporated in the dependent claims.

According to the present invention, a hair-removal apparatus is provided that comprises a hair-removal device with a movable hair-removal component, a pressing component, a skin proximity sensing component, and a force adjusting component. The movable hair-removal component comprises at least a first hair-contacting member and a second hair-contacting member which are movable relative to each other and which are configured and arranged to mutually co-operate for removing hairs by mutually exerting a contact force. The pressing component is configured and arranged to generate said contact force by exerting a pressing force on the movable hair-removal component during operation. The skin proximity sensing component is configured and arranged to detect, during operation, a relative distance between the movable hair-removal component and a portion of skin with hairs to be removed. The force adjusting component is configured and arranged to adjust, during operation, the pressing force exerted by the pressing component in dependence on the relative distance detected by the skin proximity sensing component. The movable hair-removal component has a functional mode wherein the contact force has a first value and a non-functional mode wherein the contact force has a second value smaller than the first value. The force adjusting component is configured and arranged to adjust the pressing force exerted by the pressing component such that, when the relative distance detected by the skin proximity sensing component is a first relative distance, the movable hair-removal component operates in the non-functional mode and, when the relative distance detected by the skin proximity sensing component is a second relative distance smaller than the first relative distance, the movable hair-removal component operates in the functional mode.

As an advantage, the improved hair-removal apparatus is more user friendly in that the noise level of the hair-removal apparatus during operation is greatly reduced when the apparatus is not in contact with the skin. The reduced noise level results from the fact that, in the non-functional mode of the hair-removal component, the contact force mutually exerted by the co-operating first and second hair-contacting members is reduced as compared to the functional mode, wherein the contact force causes a considerable noise level, for example as a result of the first and second hair-contacting members entering into contact or as a result of friction between the first and second hair-contacting members when mutually moving under the presence of the contact force. This may also have a positive psychological effect on the user. As a further advantage, when the apparatus has an integrated battery, the use time of the battery is significantly increased, because less energy is needed during the time the apparatus is not touching the skin. The reduced energy consumption results from the fact that, in the non-functional mode wherein the movable hair-removal component is not effective, e.g. not clamping (when used for epilating) or not cutting (when used for shaving or trimming), less power is required as a result of the reduced contact force mutually exerted by the co-operating first and second hair-contacting members to operate the movable hair-removal component, for example, to rotate the epilator cylinder. This supports also sustainability, because energy consumption is reduced when possible. As the energy consumption is low, the device may require smaller and/or fewer batteries, thus leading to more design freedom.

The term “pressing component” relates to a component that exerts the pressing force on the movable hair-removal component in order to generate the contact force mutually exerted by the co-operating first and second hair-contacting members. The pressing component may be a spring, a piezoelectric actuator or another suitable component for exerting the pressing force. The term “force adjusting component” relates to a component that can adjust the pressing force exerted by the pressing component on the movable hair-removal component. In examples wherein the pressing component is of a mechanical type, such as for example a spring, the force adjusting component may for example be of a mechanical type mechanically interacting with the pressing component. In examples wherein the pressing component is of an electrical type, such as a piezoelectric actuator, the force adjusting component may for example be an electronic control unit which electronically controls the operation of the pressing component.

The term “first relative distance” is also referred to as non-functional distance, or idling distance, or non-operating distance, or non-working distance or position, and the term “second relative distance” is also referred to as functional distance, or functional proximity, or working distance or working proximity, or as operational distance or operational proximity or position.

In a preferred embodiment of the hair-removal apparatus according to the invention, the second value of the contact force is zero. In this embodiment, the mutually co-operating first and second hair-contacting members do not mutually exert a contact force in the non-functional mode of the movable hair-removal component. As a result, the noise level and energy consumption in the non-functional mode of the movable hair-removal component are reduced to a maximum degree.

In a further embodiment of the hair-removal apparatus according to the invention, the force adjusting component is configured and arranged to adjust the pressing force exerted by the pressing component such that, when the relative distance detected by the skin proximity sensing component is above a predetermined threshold value, the movable hair-removal component operates in the non-functional mode and, when the relative distance detected by the skin proximity sensing component is below the predetermined threshold value, the movable hair-removal component operates in the functional mode. In this embodiment, the predetermined threshold value of the relative distance is for example a relatively small distance, so that, when the user moves the hair-removal apparatus towards the skin, the force adjusting component automatically switches the movable hair-removal component from the non-functional mode into the functional mode when the distance between the hair-removal component and the skin decreases to a value below said threshold value and, when the user moves the hair-removal apparatus away from the skin, the force adjusting component automatically switches the movable hair-removal component from the functional mode into the non-functional mode when the distance between the hair-removal component and the skin increases to a value above said threshold value.

According to an example, the pressing force exerted by the pressing component has a predefined maximum value, wherein the force adjusting component is configured and arranged to reduce the pressing force exerted by the pressing component in the non-functional mode of the movable hair-removal component to a reduced value smaller than the predefined maximum value. Furthermore, the force adjusting component is configured and arranged to release the pressing component in the functional mode of the movable hair-removal component such that the pressing force exerted by the pressing component has the predefined maximum value.

The operation in the functional mode is also referred to as hair-removal operation. The operation in the non-functional mode is also referred to as inter-operation.

The predefined maximum value of the pressing force for example depends on the resilient force of the spring, in an embodiment wherein the pressing component comprises a spring, or on the maximum range of the motion of the linear actuator, in an embodiment wherein the pressing component comprises a linear actuator. In other words, the pressing force has a range depending, for example, on the resilient force of the spring or on the maximum range of the motion of the linear actuator.

According to an example, the skin proximity sensing component comprises a mechanical contact sensor configured and arranged to detect the relative distance by mechanical contact.

Alternatively, the contact sensor may be an electrical contact sensor including, for example, a capacitive touch sensor, a resistance touch sensor or a piezoelectric touch sensor.

When the skin proximity sensing component comprises a mechanical contact sensor, the force adjusting component may be configured and arranged to mechanically adjust the pressing force. This may be achieved by mechanically coupling the mechanical contact sensor to the force adjusting component such that the mechanical contact sensor mechanically interacts with the force adjusting component.

For example, the force adjusting component receives a mechanical input motion and/or a mechanical input force from the mechanical contact sensor and transforms said input motion or mechanical input force into an output motion and/or an output force to adjust the pressing force, for example, by levers or gears.

According to an example, the mechanical contact sensor comprises a lever arrangement pivotably mounted relative to the hair-removal device. The lever arrangement comprises a primary lever portion with a distal end configured and arranged to contact a skin portion during operation, and a secondary lever portion comprising a separating member. The primary and secondary lever portions are mutually coupled. The separating member is displaceable, by rotation of the lever arrangement, from a blocking position to a releasing position. In the blocking position, the separating member is arranged between the pressing component and the movable hair-removal component such that the separating member at least partially prevents transmission of the pressing force to the movable hair-removal component. In the releasing position, the separating member releases the pressing component such as to enable the pressing component to transmit the pressing force to the movable hair-removal component. The primary lever portion is arranged to touch the skin, during operation, in order to displace the separating member into the releasing position. In this embodiment the lever arrangement is rotated by contact of the primary lever portion with the skin when the user brings the hair-removal apparatus into contact with skin. Thereby, the separating member is displaced from the blocking position into the releasing position, so that the pressing component is enabled to exert its pressing force on the movable hair-removal component, and the movable hair-removal component is switched into its functional mode.

According to an example, the pressing component comprises a mechanical spring member. In this example, in the blocking position of the separating member, the mechanical spring member exerts the pressing force on the separating member, so that the mechanical spring member is prevented from transmitting its pressing force to the movable hair-removal component, and the movable hair-removal component is maintained in its non-functional mode.

According to an example, the skin proximity sensing component comprises a non-contact sensor configured and arranged to detect the relative distance in a contactless manner. For example, the non-contact sensor is an optical sensor, a proximity sensor, or a capacitive sensor.

According to an example, the pressing component is configured and arranged to exert the pressing force on a pressure-receiving component of the movable hair-removal component. The force adjusting component comprises an electrically controlled actuator configured and arranged to exert a retracting force on the pressure-receiving component in a direction opposite to a direction of the pressing force. The skin proximity sensing component is configured and arranged to provide to the electrically controlled actuator a control signal corresponding to the relative distance detected by the skin proximity sensing component. In this embodiment, when the skin proximity sensing component detects the proximity of the skin, the skin proximity sensing component provides a control signal to the electrically controlled actuator, as a result of which the actuator exerts its retracting force on the pressure-receiving component of the movable hair-removal component. Said retracting force opposes the pressing force exerted by the pressing component, so that the pressing component is prevented from transmitting its pressing force to the movable hair-removal component, and the movable hair-removal component is maintained in its non-functional mode.

According to an example, the pressing component comprises a mechanical spring member, and the electrically controlled actuator comprises an electromagnet.

According to an example, the apparatus is an epilator. The movable hair-removal component is an epilating cylinder which is rotatable about a longitudinal rotational axis. In this example, the first hair-contacting member and the second hair-contacting member each constitute a hair-clamping member of a plurality of hair-clamping members of the epilating cylinder for catching and clamping hairs and pulling the hairs out of the skin. During operation, the pressing component exerts the pressing force on the hair-clamping members in a radially offset position with respect to the longitudinal rotational axis such that adjacent hair-clamping members are urged against each other at least in a radially offset area for providing a clamping force between the adjacent hair-clamping members. In the functional mode of the epilating cylinder, the epilating cylinder rotates about the rotational axis and the hair-clamping members are periodically forced into a mutual clamping arrangement by the pressing force of the pressing component in order to clamp hairs and extract the hairs from the skin under influence of the contact force having its first value. In the non-functional mode of the epilating cylinder, the epilating cylinder may still rotate about the rotational axis, but the hair-clamping members are not forced into mutual clamping arrangement by the pressing component, or only to a limited extent generating the second reduced value of the clamping force. As a result, any noise caused by the hair-clamping members when arriving into the mutual clamping arrangement is prevented or limited.

According to an example, the apparatus is provided as a shaving apparatus and the movable hair-removal component is a hair cutter, wherein the first hair-contacting member comprises a stationary grid and wherein the second hair-contacting member comprises a plurality of cutting blades that are movable in relation to the grid. During operation, in the functional mode of the hair-removal component the pressing force urges the plurality of moving cutting blades against the stationary grid. This produces noise caused by the cutting blades moving in frictional contact with the stationary grid. In the non-functional mode of the hair-removal component, the plurality of cutting blades may still move relative to the stationary grid, but due to the absence or reduction of the pressing force exerted by the pressing component on the moving cutting blades the noise level is considerably reduced.

According to a further example, the apparatus is provided as a trimming or hair cutting apparatus and the first hair-contacting member comprises a stationary guard blade and the second hair-contacting member comprises a cutter blade movable in relation to the guard blade. During operation, in the functional mode of the hair-removal component the pressing force urges the moving cutter blade against the stationary guard blade. This produces noise caused by the cutter blade moving in frictional contact with the stationary guard blade. In the non-functional mode of the hair-removal component, the cutter blade may still move relative to the stationary guard blade, but due to the absence or reduction of the pressing force exerted by the pressing component on the moving cutter blades the noise level is considerably reduced.

According to an example, the apparatus further comprises a support structure with a drive motor configured and arranged to drive the movable hair-removal component and a hair-removal head. The hair-removal head comprises the hair-removal device with the movable hair-removal component, the skin proximity sensing component, the force adjusting component, and a gear arrangement for driving the movable hair-removal component. The support structure and the hair-removal head are configured and arranged to be removably attached to each other.

According to an aspect, a skin proximity sensing component is arranged on, for example, an epilating apparatus for detecting the contact or the relative distance between the epilating apparatus and the skin. The epilating apparatus comprises a rotating cylinder having tweezer-like elements that periodically close and open during rotation of the cylinder in order to clamp hairs and pull the clamped hairs out of the skin by the rotation of the cylinder. A clamping spring system is provided as a pressing component to force the tweezer-like elements to close and provide sufficient clamping force on the hairs. Further, a force adjusting component is provided to disable the clamping spring system from applying its spring force to the tweezer-like elements when the apparatus is not in contact with the skin, and to enable the clamping spring system to apply its spring force to the tweezer-like elements when the apparatus is brought into contact with the skin.

In a first embodiment, a mechanical lever is incorporated into the epilation head of the epilating apparatus. When the apparatus is not in contact with the skin, the lever is in its default position, under the influence of a return spring, in which the lever forces the clamping spring into a condition in which the clamping spring does not exert its spring force on the tweezer-like elements. When the apparatus is brought into contact with the skin, the lever is pushed by the skin into a position in which it releases the clamping spring and enables the clamping spring to exert its spring force on the tweezer-like elements. When the apparatus is removed again from the skin, the lever returns to its default position under the influence of the return spring, and the lever again forces the clamping spring into the condition where it does not exert its spring force on the tweezers.

In a second embodiment, a contactless skin proximity sensor is used to detect whether the apparatus is in contact with the skin or not. When the sensor detects no skin contact, an electromagnetic device is activated by a control unit, so that the clamping spring system is brought into a condition in which it does not apply its spring force to the tweezer-like elements. When the sensor detects skin contact, the electromagnetic device is deactivated, so that the clamping spring system is released and enabled to exert its spring force on the tweezer-like elements.

The arrangement of the skin proximity sensing component and the force adjusting component is applicable not only to an epilating apparatus, but also to, for example, electrical shavers and grooming devices. In the example of a rotary shaver, when the user removes the shaver from the face, the spring force which presses the rotating internal cutter into contact with the external cap is reduced. This also works with hair-cutters. When the hair cutter is not in contact with the skin, the spring force which pushes the stationary guard and the moving cutter together is reduced. When the hair cutter is in contact with the skin, the skin proximity sensing component detects the contact and the spring force has its normal operating level.

These and other aspects of the present invention will become apparent from and elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1A:
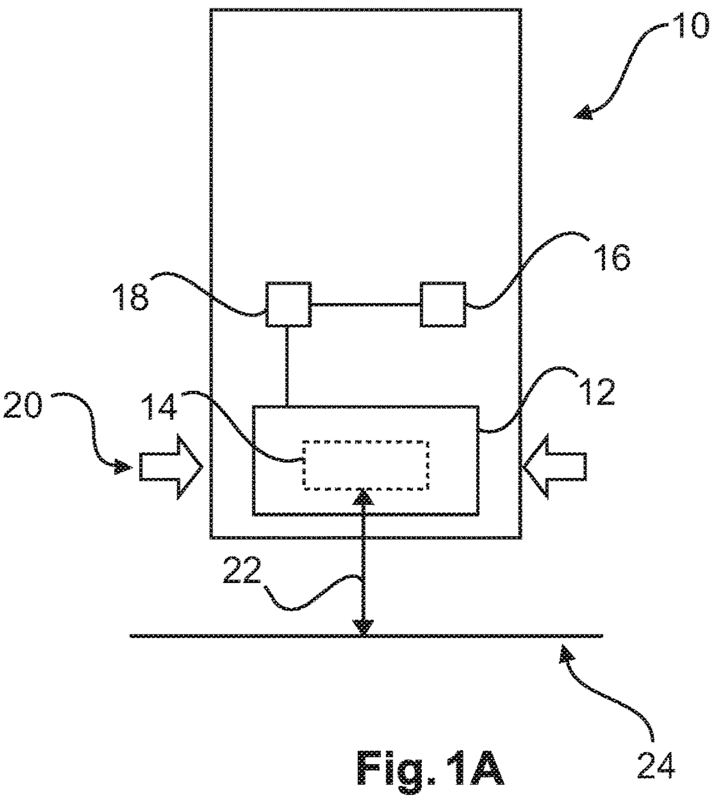
FIG. 1A shows an example of a hair-removal apparatus according to the invention in a schematic view.

FIG. 1A shows a schematic view of an example of a hair-removal apparatus 10 according to the invention. The apparatus 10 comprises a hair-removal device 12 with a movable hair-removal component 14, a pressing component 40 (see FIGS. 2A and 2B, not shown in FIGS. 1A and 1B), a skin proximity sensing component 16 and a force adjusting component 18. The movable hair-removal component 14 is of a type comprising at least a first hair-contacting member (not shown in FIGS. 1A and 1B) and a second hair-contacting member (non shown in FIGS. 1A and 1B) which are movable relative to each other and which are configured and arranged to mutually co-operate for removing hairs by mutually exerting a contact force. The pressing component 40 is configured and arranged to exert, during operation, a pressing force, indicated by means of an arrow 20 for illustration purposes only, on the movable hair-removal component 14 in order to generate the contact force mutually exerted by the first and second hair-contacting members. The skin proximity sensing component 14 is configured and arranged to detect, during operation, a relative distance, indicated by means of a double arrow 22, between the movable hair-removal component 14 and a portion of skin 24 with hairs to be removed. It is noted that the portion of the skin 24 is simplified to a plane surface indicated by means of the reference line, without further indicating a rather complex skin surface with concave and convex portions. The force adjusting component 18 is configured and arranged to adjust, during operation, the pressing force 20 exerted by the pressing component 40 on the movable hair-removal component 14 in dependence on the relative distance 22 detected by the skin proximity sensing component 16. The movable hair-removal component 14 has a functional mode wherein the contact force between the first and second hair-contacting members has a first value and a non-functional mode wherein said contact force has a second value smaller than the first value. In particular, the force adjusting component 18 is configured and arranged to adjust the pressing force 20 exerted by the pressing component 40 such that, when the relative distance 22 detected by the skin proximity sensing component 16 is a first relative distance 26 (shown in FIG. 1B), the movable hair-removal component 14 operates in the non-functional mode and, when the relative distance 22 detected by the skin proximity sensing component 16 is a second relative distance 28 (shown in FIG. 1B) smaller than the first relative distance 26, the movable hair-removal component (14) operates in the functional mode.

The term "hair-removal apparatus" relates to body hair-removal. The term "body hair" relates to hair on surfaces of the human body. The body hair is thus differentiated from head hair. The intended use of the hair-removal apparatus is primarily the removal of body hair, although head hair can also, at least in principle, be removed by the apparatus. Therefore, the apparatus is a handheld apparatus for (mechanically) removing body hair on human skin. The hair-removal apparatus may be an electrical domestic appliance for personal use. The hair-removal apparatus may also be an electrical appliance for professional use, such as in professional hair-removal studios. In an example, the apparatus is at least one of the group of: i) an epilator, ii) a shaver, and iii) a (hair-) trimmer.

The term "hair-removal device", also referred to as hair-removal arrangement, relates to a device that removes body hairs, e.g. by cutting, trimming or epilating. In case of the apparatus being an epilator, the hair-removal device may be an epilating device. In case of the apparatus being a shaver or (hair-) trimmer, the hair-removal device may be a shaving device or hair-trimming device.

The term "movable hair-removal component" relates to the component of the hair-removal device that actually provides the hair removal. The movable hair-removal component is of a type comprising at least a first hair-contacting member and a second hair-contacting member which are movable relative to each other and which are configured and arranged to mutually co-operate for removing hairs by mutually exerting a contact force. For example, when the movable hair-removal component is an epilating cylinder, the first and second hair-contacting members may be hair-clamping members of the epilating cylinder which mutually co-operate to catch and clamp hairs under the influence of the contact force mutually exerted by the hair-clamping members. In a still further example, the movable hair-removal component is a shaver head, the first hair-contacting member is a stationary external cutting member with hair-entry openings, and the second hair-contacting member is a movable, e.g. rotatable or linearly reciprocating, internal cutting member in pressure contact with the external cutting member. In another example, the movable hair-removal component is a hair-cutting component for hair-trimming, the first hair-contacting member is a stationary cutting member with stationary cutting teeth, and the second hair-contact member is a linearly reciprocating cutting member with cutting teeth in pressure contact with the stationary cutting member.

The term "skin proximity sensing component" relates to a component capable of detecting the presence of nearby objects, e.g. detecting a close vicinity of the skin, such as direct contact with the skin. The skin proximity sensing component is also referred to as a skin distance sensing component. In other words, the skin proximity sensing component detects a relative distance between the movable hair-removal component, such as a shaving head, or trimming head, or epilating cylinder (or hair-clamping members), and a portion of the skin.

The skin proximity sensing component may be provided as various types of sensors. For example, the skin proximity sensing component may be provided as an electromagnetic sensor, which emits an electromagnetic field or a beam of electromagnetic radiation (infrared, for instance), and which looks for changes in the field or return signal. In a further example, the skin proximity sensing component may be provided as a capacitive sensor, which detects changes in capacitance when the sensor touches the skin.

Therefore, the skin proximity sensing component may be provided as a contact sensor and/or a non-contact sensor (also see below).

In case of the skin proximity sensing component being a contact sensor, the skin proximity sensing component may be provided on a head unit or head portion of the hair removal apparatus, i.e. on the hair-removal head, such as a shaving head, trimmer head or epilator head.

The term "skin contact portion" relates to an outer part of the hair-removal device, e.g. the housing of an epilator head that will be brought into contact with the skin during use. In other words, during operation, the skin contact portion touches the skin at least partly.

The skin proximity sensing component may also be provided on a skin contact portion of a component that is attached to the hair-removal head. For example, a skin proximity sensing cap is provided to be removably attached to the hair-removal head during use. The skin proximity sensing component may also be provided on a skin contact portion of the skin proximity sensing cap for recognizing the skin contact.

In case of the skin proximity sensing component being a non-contact sensor, the skin proximity sensing component has a maximum detection range, i.e. a maximum distance that the skin proximity sensing component can detect. Depending upon the maximum detection range, the skin proximity sensing component may be provided on a different portion of the apparatus. In case of the skin proximity sensing component with a short detection range, such as 30 mm, the skin proximity sensing component may be provided on the front portion of the apparatus. In case of the skin proximity sensing component with a long detection range, such as 10 cm, the skin proximity sensing component may be provided on the end portion of the apparatus.

The term "front portion" relates to the portion in the vicinity of the skin contact portion of the apparatus during use. In other words, during operation, the front portion is close to or in a vicinity of the skin.

The term "end portion" thus relates to the portion on the opposite side of the front portion, i.e. away from the skin during operation.

The term "to exert a pressing force" relates to a pressing force that is applied during operation and in relation to the movable hair-removal component in order to generate the contact force between the first and second hair-contacting members of the movable hair-removal component. For example, the second hair-contacting member of the movable hair-removal component is urged or pressed against a guiding surface of the first hair-contacting member during operation, such as an internal cutter urged against a shear foil or shaving foil. In this example the pressing force acts on a hair-contacting member moving in relation to a stationary, i.e. non-moving, hair-contacting member. In another example, the pressing force acts on the two movable hair-contacting members which are also movable relative to each other. E.g. the pressing force urges members of a plurality of rotating hair-contacting members against each other, but does not press them against a stationary support or guiding surface of the hair-removal device. For example, rotating epilating disks are urged against each other during operation. In general, the first and second hair-contacting members constitute two co-operating elements of the hair-removal component which actually come into contact with hair during operation and which are moveable relative to each other in order to act on the hair, such as clamping the hair or cutting the hair. The contact force mutually exerted by the first and second hair-contacting members may for example be used to clamp hairs between clamping surfaces of the first and second hair-contacting members, or to generate a cutting force exerted on the hair by cutting edges provided on the first and second hair-contacting members.

Figure 1B:
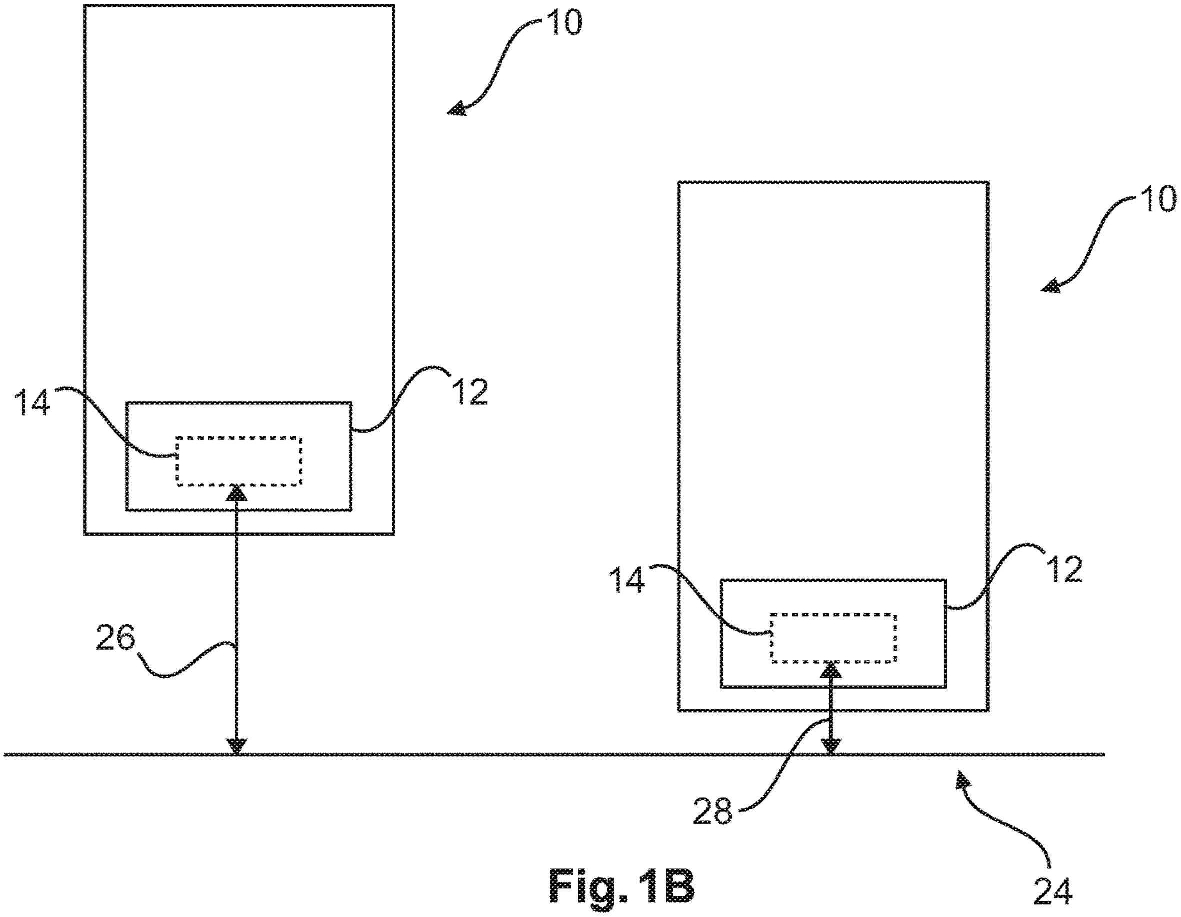
FIG. 1B shows the apparatus of FIG. 1A at two relative distances with respect to the skin.

FIG. 1B shows the example of the hair-removal apparatus 10 of FIG. 1A at two relative distances relative to the skin. When the relative distance 22 detected by the skin proximity sensing component 16 (see FIG. 1A, not further shown in FIG. 1B) is a first relative distance, indicated by means of a double arrow 26, the movable hair-removal component 14 operates in the non-functional mode. When the relative distance 22 detected by the skin proximity sensing component 16 is a second relative distance, indicated by means of a double arrow 28, the movable hair-removal component 14 operates in the functional mode. The first relative distance 26 is larger than the second relative distance 28. In the functional mode, the pressing force 20 (see FIG. 1A, not further shown in FIG. 1B) exerted by the pressing component 40 (see an example in FIGS. 2A and 2B) on the movable hair-removal component 14 during operation is larger than in the non-functional mode, so that the first value of the contact force between the first and second hair-contacting members in the functional mode of the movable hair-removal component 14 is larger than the second value of said contact force in the non-functional mode of the movable hair-removal component 14.

In general, the term "second relative distance" relates to a closer vicinity, such as contact, than the first relative distance. For example, the second relative distance relates to a short range, for example corresponding to the length of the hairs to be removed, e.g. hairs to be clamped (when epilating) or to be cut (when shaving or trimming), for example 10 mm. In a further example, the second relative distance relates to physical contact between the hair-removal members, such as clamping members, and a portion of the skin.

In general, the term "first relative distance" relates to any distance that is larger than the second relative distance. For example, the first relative distance is two times larger than the second relative distance, such as 20 mm. For example, the first relative distance is ten times larger than the second relative distance, such as 10 cm.

Preferably, the force adjusting component 18 is configured and arranged to adjust the pressing force 20 exerted by the pressing component 40 such that, when the relative distance 22 detected by the skin proximity sensing component 16 is above a predetermined threshold value, the movable hair-removal component 14 operates in the non-functional mode and, when the relative distance 22 detected by the skin proximity sensing component 16 is below the predetermined threshold value, the movable hair-removal component 14 operates in the functional mode. In this embodiment, any value of the relative distance 22 above the predetermined threshold value may be referred to as the "first relative distance", and any value of the relative distance 22 below the predetermined threshold value may be referred to as the "second relative distance".

The term "non-functional mode" relates to a non hair-removal state of the movable hair-removal component, wherein the movable hair-removal component may still move, such as rotate in the case of an epilating cylinder. For example, the non-functional mode relates to a non hair-clamping state (when epilating) or a non hair-cutting state (when shaving or trimming).

On the contrary, the term "functional mode" relates to a hair-removal state of the movable hair-removal component during operation, such as a hair-clamping state (when epilating) or a hair-cutting state (when shaving or trimming).

Figure 2A:
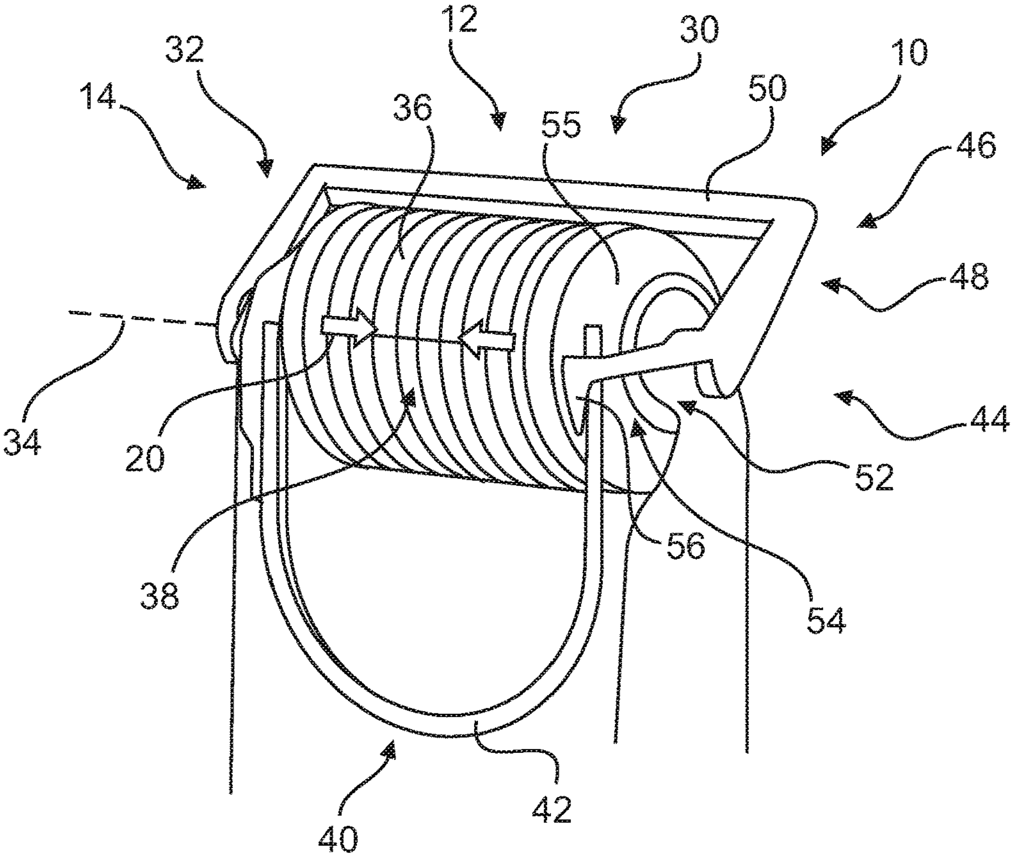
FIG. 2A shows a further example of a hair-removal apparatus according to the invention in a perspective view.

FIG. 2A shows an epilator 30 as an example of the hair-removal apparatus 10 according to the invention. The epilator 30 comprises an epilating cylinder 32 as the movable hair-removal component 14. The epilating cylinder 32 is rotatable about a longitudinal rotational axis, indicated by means of a dotted line 34. The epilating cylinder 32 comprises a number of hair-clamping members 36 for catching and clamping hairs and pulling them out of the skin. The hair-clamping members 36 constitute hair-contacting members of the movable hair-removal component 14 which are movable relative to each other from a non-clamping position into a clamping position. It is noted that FIG. 2A shows only the head part or head unit of the apparatus 10.

During operation, the pressing force 20 acts on the hair-clamping members 36 in a radially offset position with respect to the longitudinal rotational axis 34, such that adjacent hair-clamping members 36 are urged against each other at least in a radially offset area 38 for providing a contact force, i.e. a clamping force between the adjacent hair-clamping members 36.

The term "epilating" in this context does not mean that all hairs are pulled out including their roots. It just means that the hairs are gripped and pulled from the skin. Some roots may remain in the skin. Depending upon the strength and brittleness of the hairs, the term epilating may also relate to snapping off the hairs rather than pulling the hairs from the skin.

The term "epilating cylinder" relates to a rotary part of an epilator head. It is noted that the epilating cylinder is a rotary arrangement of the hair-clamping members as is known to a skilled person. The cylinder may also have a drum-shaped, curved or concave or convex structure. For example, the epilating cylinder has a curved shape for a better match with the contour of the skin portion. Furthermore, the term "rotary" relates not only to a continuous rotation but may also relate to an oscillatory pivot movement or partial rotation of the cylinder or the like. The epilating cylinder is attached or mounted to the epilator head in a rotary manner. For example, the epilating cylinder is mounted on an axle and rotates about it.

The epilating cylinder may also be referred to as rotational epilating cylinder or rotating epilating cylinder.

The term "longitudinal rotational axis" relates to an axis about which the epilating cylinder rotates or at least pivots. For example, the axis is fixed by an axle, on which the epilating cylinder is mounted. During operation, the rotational axis is parallel to the skin surface to achieve better contact of the hair-clamping members with the skin surface.

The expression "parallel" also relates to deviations from the parallel arrangement, e.g. up to +/−50 or +/−10° or +/−15°.

In another example, an axis for rotation is provided, which has a curved shape, for example in order to provide an epilating structure which is shaped accordingly.

The term "hair-clamping members" relates to a package or an assembly of elements capable of catching, clamping and pulling hairs out of the skin during a hair-removal operation. Thus, the hair-clamping members are also referred to as hair-clamping elements, or as a hair-clamping assembly. The hair-clamping members are provided adjacent to each other and coaxially with the rotational axis to form the epilating cylinder.

The hair-clamping members may have different designs. For example, the hair-clamping members are provided as windings of a coil spring, which capture and release hairs during the rotation. In another example, the hair-clamping members are provided as rotating discs. In a still further example, the hair-clamping members take the form of tweezer-like discs, which rotate with eccentric movements, thus causing the distance between the discs to vary, as a result of which the hairs are gripped, pulled out and subsequently discarded—similar to working with a pair of tweezers.

The hair-clamping members may be made of any suitable material. For example, the hair-clamping members are made exclusively of metal. In another example, the hair-clamping members can also be made as hybrid parts consisting of steel and plastics, or two different plastic materials. Further, the "clamping portion", i.e. the portion of hair-clamping members providing the pinching or clamping force, in particular the radially outward or circumferential parts of the clamping portions, is made from a relatively hard material, such as ceramic.

In case of the hair-clamping elements being windings of a coil spring, the pressing force may relate to a degree of bending of the spring during rotation, which bending urges the windings of the spiral coil against each other (to catch and clamp hairs) on the concave side and arranges them to be displaced again (to release hairs) on the concave side of the bending portion. In case of the hair-clamping elements being rotating discs or tweezer-like discs, the pressing force may relate to the force which presses the package or the assembly of hair-clamping elements together, e.g. urges them against each other by providing a pressing force from at least one side, of course, with a counter support on the opposite side of the stack of hair-clamping elements, and thereby causes the hair-clamping elements to clamp the hairs. The pressing force is provided so as to act on the hair-clamping elements in a radially offset manner with respect to the rotational axis, thus resulting in the abutment on one radially offset side. An arrangement of the pressing force aligned with the rotational axis would need additional measures to cause the disks to abut against each other.

The term "radially offset" relates to a line or axis that is parallel to, but at a certain distance from, the rotational axis, thus defining a pressing force direction. Along the pressing force direction, i.e. in a radially offset area, the adjacent hair-clamping elements are urged against each other such that they abut against each other for providing the contact or clamping force between the hair-clamping elements to remove hairs. In other words, the hair-clamping elements in the radially offset area are clamped together to pull out the hairs.

The term "abut against" relates to the act of touching, preferably in an urging or pressing manner.

The term "radially offset area" relates to the area or portion of the hair-clamping members that is periodically in contact with, i.e. abutting against, neighboring hair-clamping members during operation of the epilating apparatus in order to clamp a hair. Therefore, the radially offset area is also referred to as a "clamping portion" of the hair-clamping members, i.e. the area providing the pinching or clamping force. During operation, the radially offset area, i.e. the clamping portion, touches the skin at least partly to remove the hairs.

The term "clamping force" relates to the force between the adjacent, i.e. mutually abutting or neighboring, hair-clamping members at least in the radially offset area for clamping or pulling the hairs, and constitutes the contact force between the hair-contacting members of the movable hair-removal component. The magnitude of the clamping force is dependent on the pressing force provided on the assembly of the hair-clamping members. In an example, i.e. in a certain mode of operation, no clamping force is provided. This may be the situation where the hair-clamping members are open, or in a condition where they are not abutting against each other. In a further example, the hair-clamping members are simply touching each other in the radially offset area, but without applying any clamping force. In another situation, i.e. in another mode of operation, the clamping force is applied to pull out the hairs—that is, the hair-clamping members are not only in a close condition, i.e. abutting against each other in the radially offset area, but also push firmly against each other to provide the clamping force necessary to pull out the hairs.

FIG. 2A shows a bow-like mechanical spring member 42 as an example of the pressing component 40. In a further example, although not further shown in the drawing, the pressing component 40 is provided as a linear actuator including, for example, a piezoelectric actuator expanding under the application of a voltage, or an electro-mechanical actuator, which converts a rotary motion of the motor into a linear displacement.

Furthermore, FIG. 2A shows a lever arrangement 44 pivotably mounted relative to the hair-removal device 12. The lever arrangement 44 comprises a primary lever portion 48 with a distal end 50, which primary lever portion 48 is configured and arranged to contact a skin portion during a hair-removal operation, and a secondary lever portion 52 with a separating member 54. The primary lever portion 48 is shown as an example of the skin proximity sensing component 16 in the form of a mechanical contact sensor 46, which mechanical contact sensor 46 is configured and arranged to detect the relative distance between the movable hair-removal component 14 and the skin by mechanical contact. The secondary lever portion 52 is provided as an example of the force adjusting component 18, which is configured and arranged to mechanically adjust the pressing force 20. The primary lever portion 42 is mechanically coupled to the secondary lever portion 52 in that the primary lever portion 42 and the secondary lever portion 52 are constructed in one piece. In such a way, the primary lever portion 48 interacts mechanically with the secondary lever portion 52 for adjusting the pressing force 20.

Figure 2B:
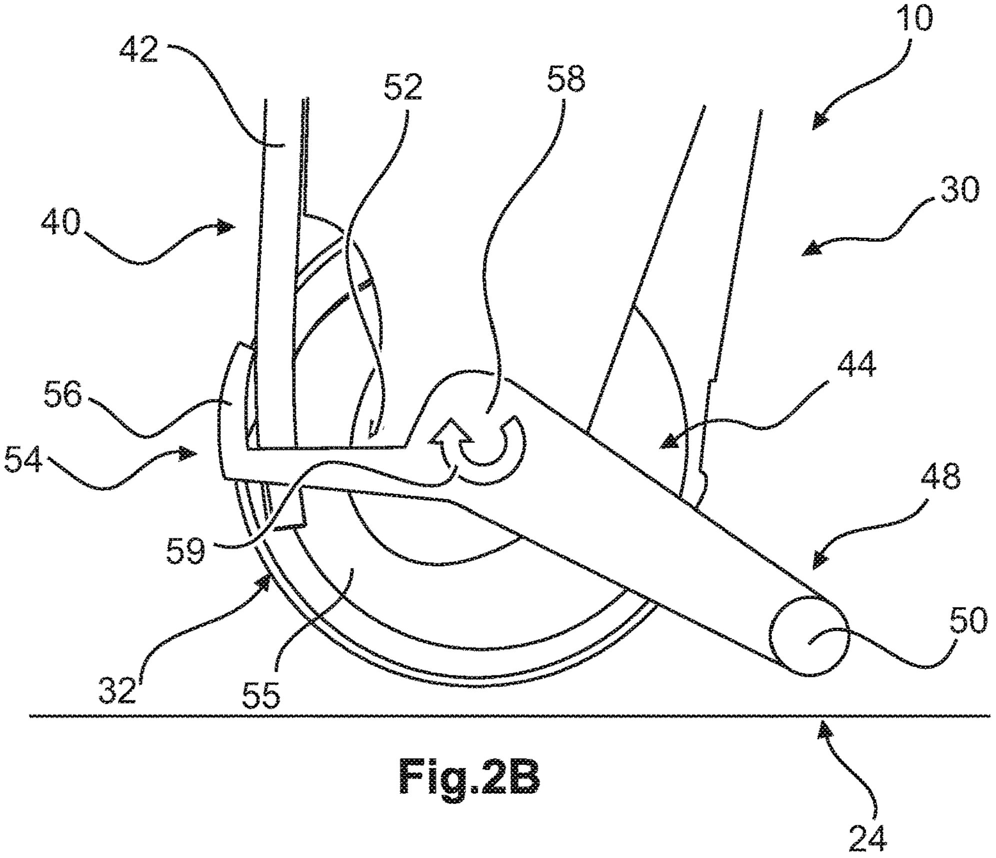
FIG. 2B shows the apparatus of FIG. 2A in a side view.

FIG. 2B shows the epilating apparatus of FIG. 2A in a side view. It is also noted that FIG. 2B shows only the front part, i.e. the head of the apparatus 10, e.g. the epilating apparatus

30. Furthermore, the epilating apparatus 30 is shown in a position in which the epilator cylinder 32 is close to the skin 24, but the distal end 50 of the primary lever portion 48 does not touch the skin 24. In other words, the epilator apparatus 30 is in the non-functional mode. This is the result of the presence of a wedge 56, an example of a separating member 54, provided at the distal end of the secondary lever portion 52 for preventing the mechanical spring member 42 from applying the pressing force on the epilator cylinder 32. In the non-functional mode of FIG. 2B, the mechanical spring member 42 exerts its pressing force 20 on the wedge 56. In other words, the wedge 56 prevents the mechanical spring member 42 from exerting the pressing force on the hair-clamping members 36 (see FIG. 2A, not further shown in FIG. 2B). The lever arrangement 44 is pivotable about a hinge 58. As an option, a return spring (not further shown) is provided returning the lever arrangement 44 to its default position (as indicated by means of a curved arrow 59), when the epilating apparatus 30 is removed from the skin 24.

Figure 3A:
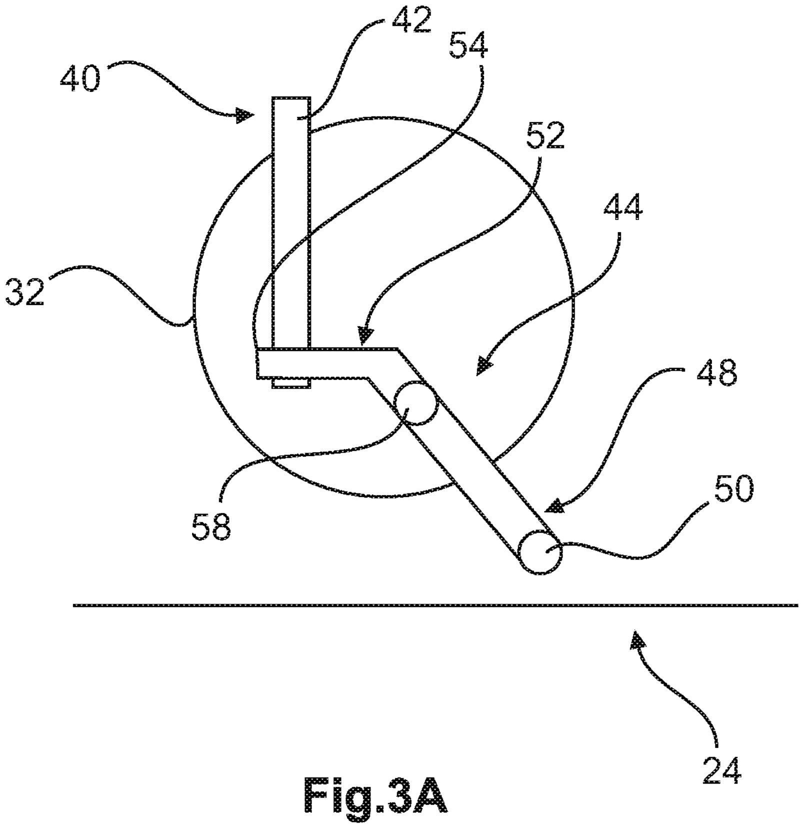
FIG. 3A shows the apparatus of FIGS. 2A and 2B in a non-functional mode.

FIG. 3A shows (as a schematic illustration) the epilating apparatus of FIGS. 2A and 2B in the non-functional mode, i.e. in the position where the distal end 50 of the primary lever portion 48 does not touch the skin 24. In the non-functional mode, the secondary lever portion 52 interacts with the mechanical spring member 42 by holding or blocking the mechanical spring member 42 such that the mechanical spring member 42 exerts a reduced or zero pressing force 20 on the epilating cylinder 32. In other words, the secondary lever portion 52 is in a blocking position, in which the separating member 54, such as the wedge 56, is arranged between the mechanical spring member 42 and the epilating cylinder 32 such that the separating member 54 at least partially prevents or reduces the transmission of the pressing force 20 to the epilating cylinder 32, thus leading to a significant noise reduction and less energy consumption.

In an example, shown as an option in FIGS. 2A and 2B, the bow-like mechanical spring member 42 exerts the pressing force 20 on the hair-clamping members 36 via a pressure-receiving component 55, such as a flexible shoulder portion shown in FIGS. 2A and 2B, arranged between the end of the mechanical spring member 42 and the epilating cylinder 32.

In a further example (not further shown), the mechanical spring member acts on the epilating cylinder from two opposing sides. The secondary lever portion is provided with two separating members that slide under two opposing sides when the mechanical spring member acts on the hair-clamping members.

The transmission of the pressing force may be blocked completely. In a further example, the transmission of the pressing force is partially blocked, so that the mechanical spring member exerts a reduced pressing force on the epilating cylinder. For example, the pressing force is reduced at least by half.

Figure 3B:
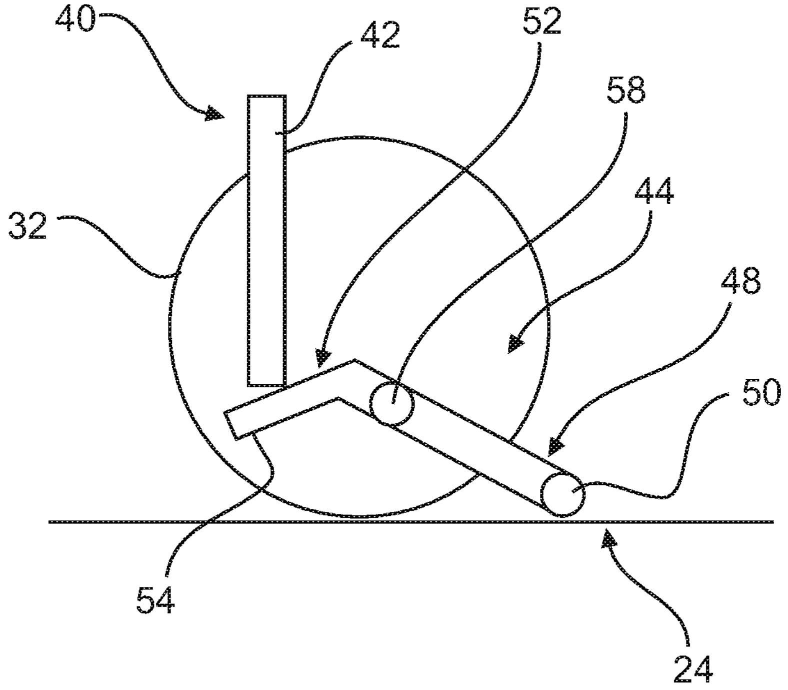
FIG. 3B shows the apparatus of FIGS. 2A and 2B in a functional mode.

FIG. 3B shows schematically the epilating apparatus of FIGS. 2A and 2B in the functional mode, i.e. in the condition wherein the distal end 50 of the primary lever portion 48 touches the skin 24. In the functional mode, the secondary lever portion 52 releases the mechanical spring member 42 such that the mechanical spring member 42 exerts a maximum pressing force 20 on the epilating cylinder 32. In other words, the secondary lever portion 52 is in a releasing position, in which the separating member 54 releases the mechanical spring member 42 such as to enable the mechanical spring member 42 to transmit the pressing force 20 to the epilating cylinder 32.

In addition, the separating member 54 is displaceable, by rotation of the lever arrangement 44, from the blocking position in FIG. 3A to the release position in FIG. 3B. During a hair-removal operation, the primary lever portion 48 is arranged to touch the skin 24 in order to displace the separating member 54 into the release position.

The separating member 54 is also displaceable, by rotation of the lever arrangement 44, from the release position in FIG. 3B into the blocking position in FIG. 3A. In an example, shown as an option in FIGS. 3A and 3B, the lever arrangement 44 is pivotable about the hinge 58. Further, a return spring (not further shown) may be provided to reset the lever from the release position to the blocking position when the primary lever portion 48 does not touch the skin 24.

The term "non-functional mode" of an epilating apparatus relates to the non-epilating state, such as the non-clamping state when an epilator comprises clamping elements. The non-functional mode may relate to the situation where the adjacent hair removal elements, e.g. hair-clamping members, do not abut against each other or do not touch each other and thus no hair-removal takes place, i.e. no hair-clamping force is applied. The non-functional mode may also relate to the situation where the adjacent hair-clamping members abut against each other or touch each other without applying the clamping force. In the non-functional mode, the hair-clamping members may still move or rotate at the same speed, but no clamping force is applied. Thus, the non-functional mode is also referred to as an idling mode.

The term "functional mode" of an epilating apparatus relates to the clamping state of the hair-clamping members. The functional mode relates to a range of the clamping force, in which range the hair-clamping force is capable of pulling out hairs. Thus, the functional mode is also referred to as a working mode.

Figure 4A:
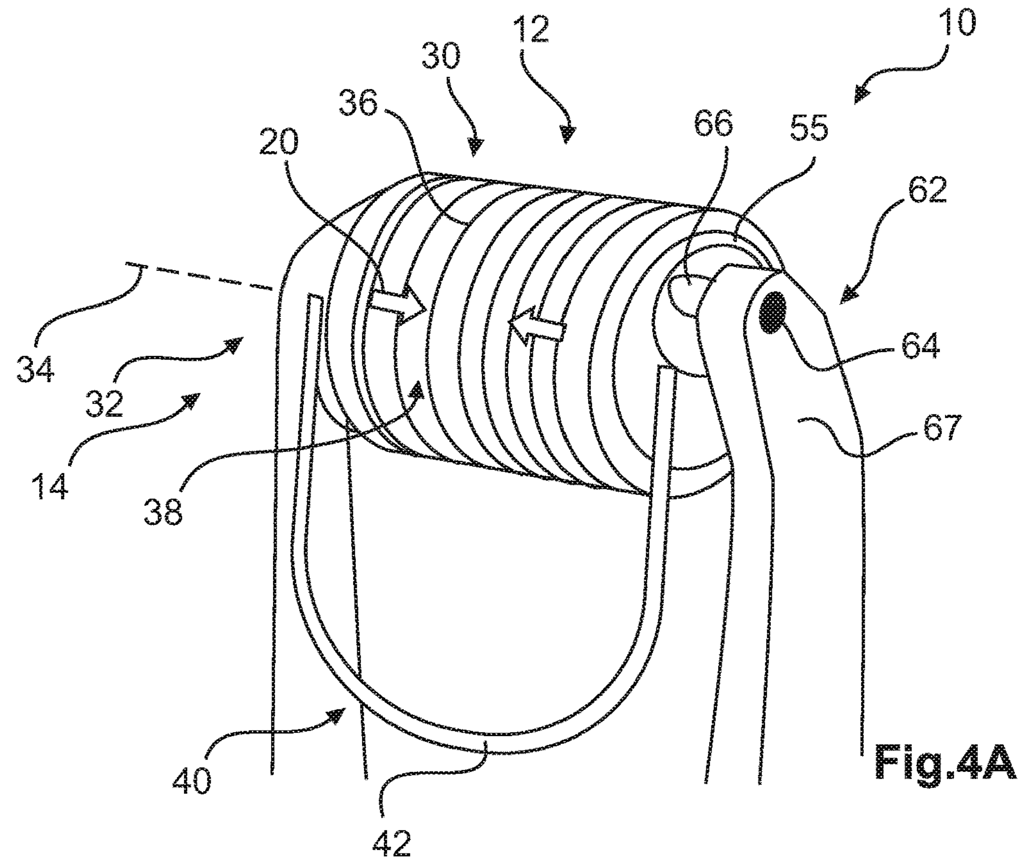
FIG. 4A shows a further example of a hair-removal apparatus according to the invention in a perspective view.
Figure 4B:
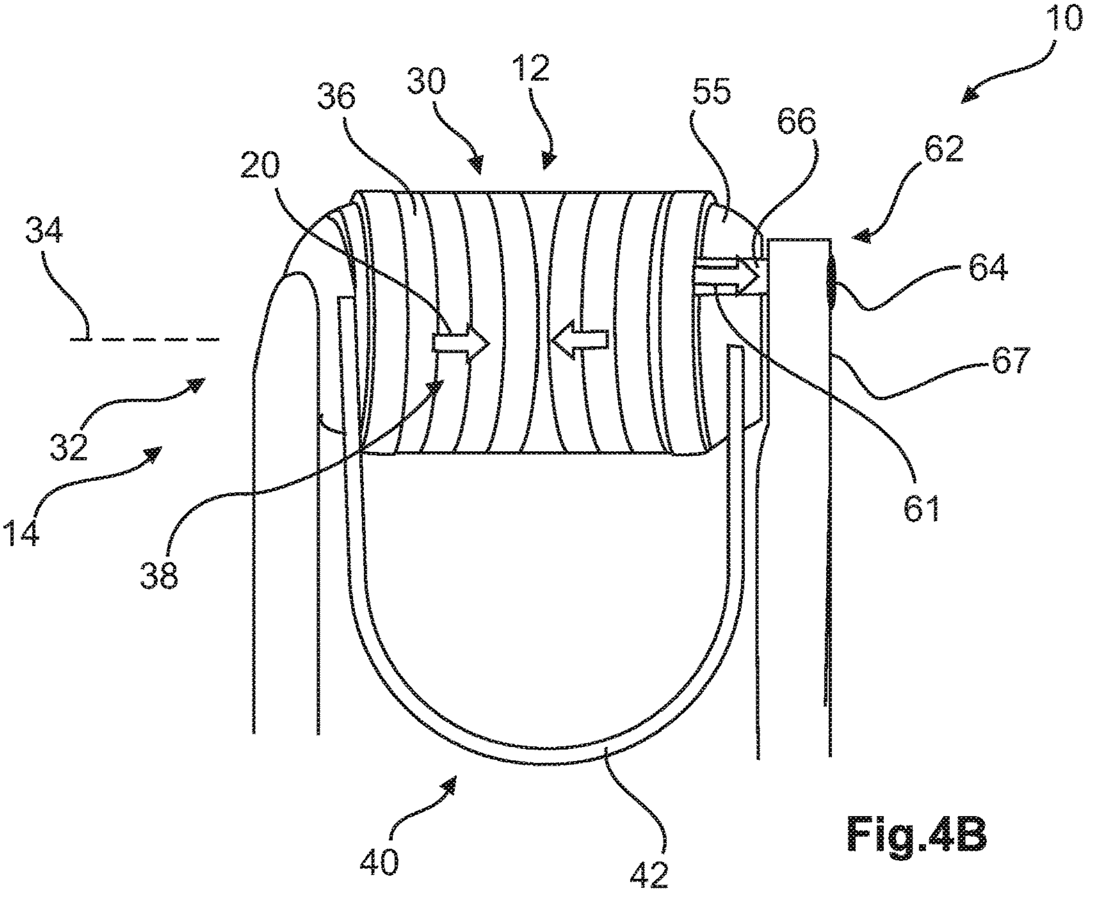
FIG. 4B shows the apparatus of FIG. 4A in a front view.

FIG. 4A shows a further example of the hair-removal apparatus 10 according to the invention, wherein the skin proximity sensing component 16 comprises a non-contact sensor 60 (see FIGS. 5A and 5B), which sensor is configured and arranged to detect the relative distance between the movable hair-removal component 14 and the skin in a contactless manner. The non-contact sensor 60 may be an optical sensor, a proximity sensor, or any other suitable sensor. FIG. 4B shows an example of the hair-removal apparatus of FIG. 4A in a front view. It is noted that both FIGS. 4A and 4B show only the front part, i.e. the head of the apparatus 10.

As an example, the pressing component 40 is also provided as the bow-like mechanical spring member 42, and the pressure receiving component 55 is shown as a flexible shoulder portion. The pressing component 40 is configured and arranged to exert the pressing force 20 on the pressure-receiving component 55 of the movable hair-removal component 14.

The force adjusting component 18 is an electrically controlled actuator 62, comprising for example an electromagnet 64 and a ferromagnetic counterpart 66. The force adjusting component 18 is configured and arranged to exert a retracing force on the pressure-receiving component 55 in a direction opposite to a direction of the pressing force 20, as indicated by means of an arrow 61 in FIG. 4B. The retracing force 61 is also referred to as a compensating force. The skin proximity sensing component 16, e.g. the non-contact sensor 60, provides a control signal to activate the actuator 62 in dependence on the relative distance detected by the skin proximity sensing component 16.

The term "compensating force" relates to a force having at least a vector opposite to the direction of the pressing force. FIG. 4B shows an example of the compensating force, or the retracing force 61, provided by the attraction force between the electromagnet 64 and the ferromagnetic counterpart 66.

The magnitude of the resulting pressing force exerted on the epilating cylinder 32 during generation of the compensation force depends on the difference between the maximum pressing force and the compensating force in the direction of the pressing force, i.e. the resulting pressing force=$F_P-F_C$ (i.e. maximum pressing force minus compensating force).

The term "to partially compensate" relates to compensating the pressing force at least partially—or, in other words, there may still be a resulting pressing force during generation of the compensation force, but smaller than the maximum pressing force of the mechanical spring member 42.

As a further option, as shown in FIGS. 4A and 4B, the electromagnet 64 is arranged on the supporting frame 67, and the ferromagnetic counterpart 66 is arranged on the pressure-receiving component 55.

Figure 5A:
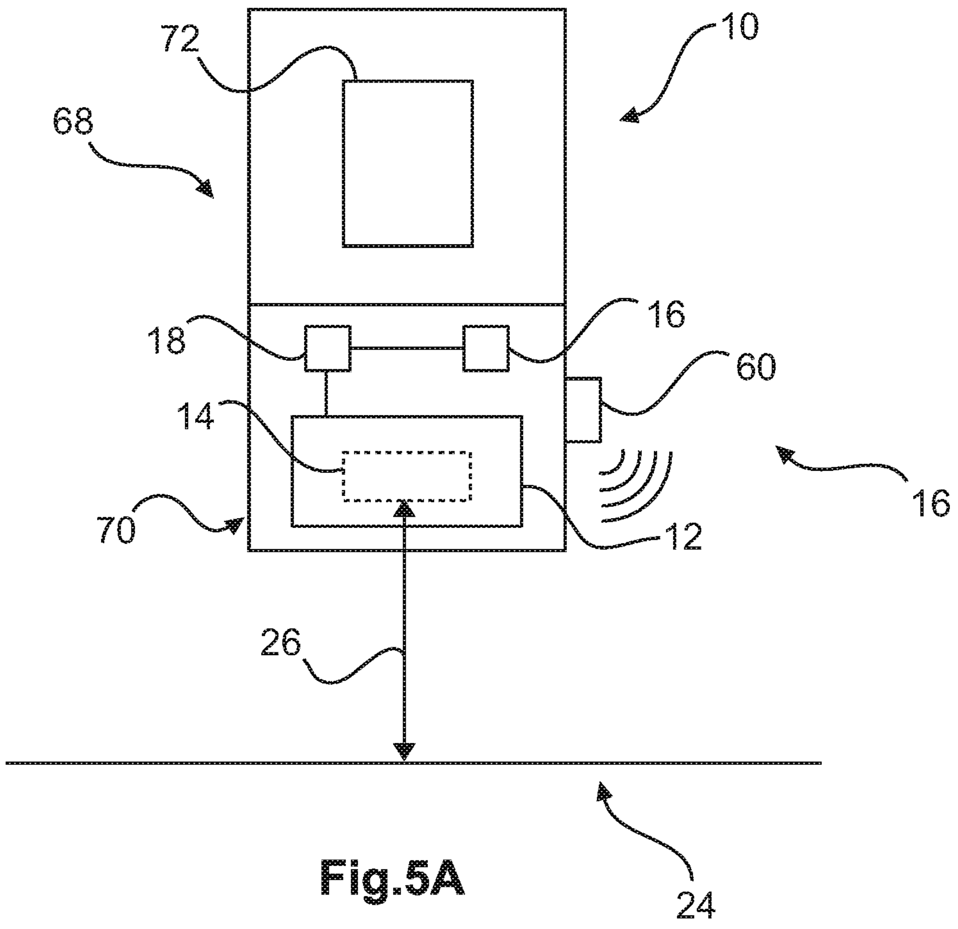
FIG. 5A shows the apparatus of FIGS. 4A and 4B in a non-functional mode.

FIG. 5A shows the hair-removal apparatus of FIGS. 4A and 4B in the non-functional mode, i.e. at the first relative distance 26 from the skin 24. At the first relative distance 26, the hair-removal component 14 does not touch the skin 24 or the hair-removal component 14 is not in a closer vicinity of the skin 24. As a result, the force adjusting component 62 counteracts the mechanical spring member 42, i.e. the pressing component 40, to at least partially compensate the pressing force 20 in that the non-contact sensor 60 activates the electromagnet 64 to attract the ferromagnetic counterpart 66, thus counteracting the mechanical spring member 42 and reducing the pressing force 20.

Figure 5B:
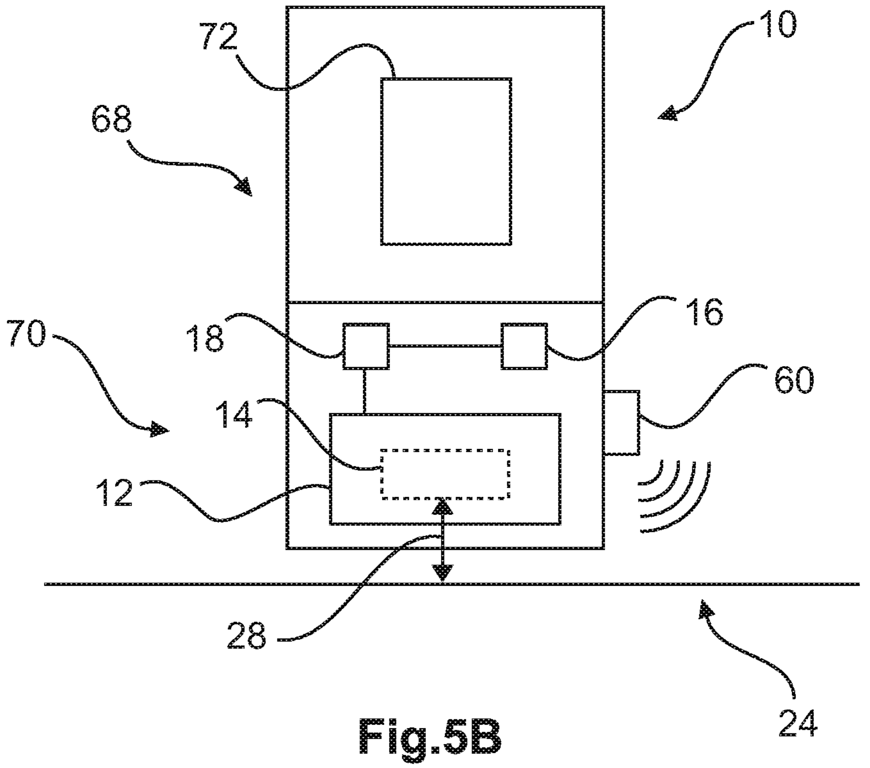
FIG. 5B shows the apparatus of FIGS. 4A and 4B in a functional mode.

FIG. 5B shows the hair-removal apparatus of FIGS. 4A and 4B in the functional mode, i.e. at the second relative distance 28 from the skin 24, or in a closer vicinity of the skin 24. At the second relative distance 28, the non-contact sensor 60 detects or recognizes the skin contact and deactivates the electromagnet 64, thus releasing the mechanical spring member 42 such that the mechanical spring member 42 exerts the maximum pressing force 20 on the movable hair-removal component 14.

The term "to release" in the context of FIGS. 4A and 4B relates to at least reducing the compensating force, i.e. the pressing component is not hindered in applying the pressing force. "To release" means to increase the pressing force exerted on the movable hair-removal component 14, which pressing force thus pushes the hair-clamping or hair-contacting members more firmly against each other in the radially offset area to provide (more) clamping or contact force to pull out the hairs.

In a further example, although not further shown in the drawing, the apparatus is provided as a shaving apparatus and the movable hair-removal component is a hair cutter, wherein the first hair-contacting member comprises a stationary grid and wherein the second hair-contacting member comprises a plurality of cutting blades that are movable in relation to the grid. In this shaving apparatus, during operation, the pressing force urges the plurality of cutting blades against the grid. In another example, the apparatus is provided as a trimming or hair cutting apparatus, the first hair-contacting member comprises a stationary guard blade and the second hair-contacting member comprises a cutter blade movable in relation to the guard blade. In this shaving apparatus, during operation, the pressing force urges the cutter blade against the guard blade.

As a further option, shown schematically in FIGS. 5A and 5B, the hair-removal apparatus 10 comprises a support structure 68 and a hair-removal head 70.

Figure 6:
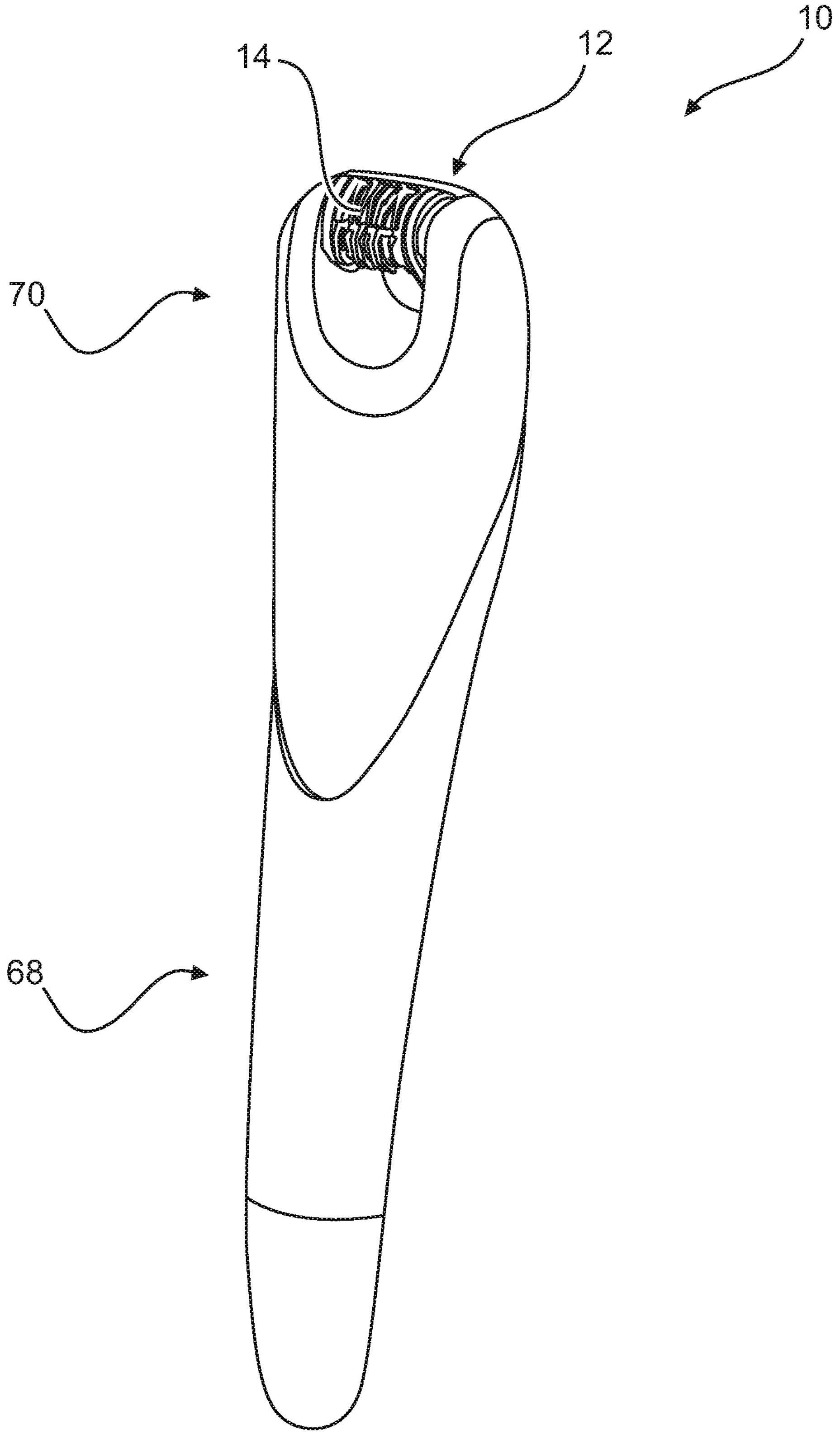
FIG. 6 shows another example of a hair-removal apparatus according to the invention in a perspective view.

FIG. 6 shows a perspective view of the hair-removal apparatus 10 with the support structure 68 and the hair-removal head 70.

Now referring back to FIGS. 5A and 5B, the support structure 68 comprises a drive motor 72 configured and arranged to drive the movable hair-removal component 14. The hair-removal head 70 comprises the hair-removal device 12 with the movable hair-removal component 14, the skin proximity sensing component 16, the force adjusting component 18 and a gear arrangement (not further shown) for driving the movable hair-removal component 14. The support structure 68 and the hair-removal head 70 are configured and arranged to be removably attached to each other. In an alternative example, the skin proximity sensing component is arranged on and supported by the support structure.

The "support structure" (or body structure) relates to a supporting structure, to which the different components of the apparatus are attached. The support structure may be provided as a housing providing a mechanically supporting structure. The support structure may be provided as a separate structure at least partly enclosed by a housing structure. The support structure may be provided as one structural element or as several structural pieces or elements that are physically, directly or indirectly, linked to each other.

The support structure may be provided as an elongate support or body structure. The term "elongate" relates to a structure having a dominant longitudinal extension, i.e. an extension in one direction being larger than an extension in the transverse direction. The support structure may have a longitudinal form with an ergonomically suitable shape. The term "ergonomically suitable" relates to a shape that is adapted for handheld operation by the user, preferably for single-hand operation.

The term "drive motor" relates to a motor device that is provided to generate the driving force for activating a hair-removal device. The drive motor is provided for the actual operation of the device. The drive motor relates to any type of motor that is capable of generating the force necessary for driving hair-removal components of the hair-removal device.

The gear arrangements enable the transfer of the driving motion of the drive motor to the epilating cylinder of the epilator head unit.

The term "head" relates to a portion of the epilating apparatus, which during operation is arranged by the user in vicinity to a skin portion to be treated, e.g. on which hairs are to be removed, i.e. in close vicinity, e.g. directly touching the skin, from which the hairs are to be removed.

The term "epilator head" relates to a head portion used to remove hair by epilating. The epilator head may be removably attached to the support structure device. For example, the epilator head unit is attached at one end of the support structure, thus providing a front or head portion (with reference to the operational mode). During operation, the apparatus may also be arranged, i.e. held by the user, in a way in which the head unit is provided on a lower part, for example if the apparatus is held upside down. In an example, the head unit is attached to the support structure at a front-end portion. In another example, the head unit is attached to the support structure in a laterally oriented manner at the end portion thereof.

The term "removably" relates to providing the head unit such that it can be removed, or demounted, in order to enable an exchange with another head unit. For example, the head unit can be replaced by a different type of head unit. The head unit can hence also be referred to as an exchangeable head unit or replaceable head unit. The term "removably" relates to the head unit being mounted in a detachable manner in order to detach the head unit from the support structure for replacement or exchange purpose. The head unit can be demounted, i.e. taken from the support structure, and another head unit can be put back on the support structure.

It has to be noted that embodiments of the invention are described with reference to different examples and aspects. However, a person skilled in the art will gather from the above and the following description that, unless otherwise notified, in addition to any combination of features belonging to one example also any combination between features relating to different examples is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A hair-removal apparatus, comprising:

a hair-removal device comprising a movable hair-removal component, the moveable hair-removal component comprising at least a first hair-contacting member and a second hair-contacting member, wherein the first hair-contacting member and the second hair-contacting member are movable relative to each other, and configured and arranged to mutually co-operate for removing hairs by mutually exerting a contact force;

a pressing component adapted to generate the contact force by exerting a pressing force on the movable hair-removal component during operation, a skin proximity sensing component adapted to detect, during operation, a relative distance between the movable hair-removal component and a portion of skin with hairs to be removed; and a force adjusting component configured to interact mechanically with the skin proximity sensing component to adjust, during operation, the pressing force exerted by the pressing component in dependence on the relative distance detected by the skin proximity sensing component, wherein the movable hair-removal component has a functional mode during which the contact force has a first value enabling the removing of the hairs and a non-functional mode during which the contact force has a second value disabling the removing of the hairs that is smaller than the first value, and wherein the force adjusting component is configured to adjust the pressing force exerted by the pressing component in dependence on the relative distance detected by the skin proximity sensing component such that, when the relative distance detected by the skin proximity sensing component is a first relative distance, the movable hair-removal component operates in the non-functional mode and, when the relative distance detected by the skin proximity sensing component is a second relative distance smaller than the first relative distance, the movable hair-removal component operates in the functional mode.

2. The hair-removal apparatus according to claim 1, wherein the second value of the contact force is zero.

3. The hair-removal apparatus according to claim 1, wherein the force adjusting component is configured to adjust the pressing force exerted by the pressing component such that, when the relative distance detected by the skin proximity sensing component is above a predetermined threshold value, the movable hair-removal component operates in the non-functional mode and, when the relative distance detected by the skin proximity sensing component is below the predetermined threshold value, the movable hair-removal component operates in the functional mode.

4. The hair-removal apparatus according to claim 1, wherein the pressing force exerted by the pressing component has a predefined maximum value;

wherein the force adjusting component is configured and arranged to reduce the pressing force exerted by the pressing component in the non-functional mode of the movable hair-removal component to a reduced value smaller than the predefined maximum value; and wherein the force adjusting component is configured and arranged to release the pressing component in the functional mode of the movable hair-removal component such that the pressing force exerted by the pressing component has the predefined maximum value.

5. The hair-removal apparatus according to claim 1, wherein, in the non-functional mode, the force adjusting component interacts with the pressing component to hold or block the pressing component, thereby preventing the pressing component from exerting the pressing force on the movable hair-removal component.

6. An epilator, comprising:

a hair-removal device comprising a movable epilating cylinder adapted to rotate around a longitudinal rotational axis, the movable epilating cylinder comprising at least a first hair-clamping member and a second hair-clamping member adjacent the first hair-clamping member, wherein the first hair-clamping member and the second hair-clamping member are movable relative to each other, and configured and arranged to mutually co-operate for removing hairs by mutually exerting a contact force, wherein the first hair-clamping member and the second hair-clamping member are each one of a plurality of hair-clamping members of the movable epilating cylinder adapted to clamp hairs and pull the hairs out of skin;

a pressing component adapted to generate the contact force by exerting a pressing force on a movable hair-removal component during operation, wherein, during operation, the pressing component exerts the pressing force on the first and second hair-clamping members in a radially offset position with respect to the longitudinal rotational axis such that first and second hair-clamping members are disposed against each other at least in a radially offset area for providing the contact force between the first and second hair-clamping members;

a skin proximity sensing component adapted to detect, during operation, a relative distance between the movable hair-removal component and a portion of skin with hairs to be removed; and a force adjusting component configured to interact mechanically with the skin proximity sensing component to adjust, during operation, the pressing force exerted by the pressing component in dependence on the relative distance detected by the skin proximity sensing component, the movable epilating cylinder having a functional mode during which the contact force has a first value enabling the clamping of the hairs and a non-functional mode during which the contact force has a second value that is smaller than the first value disabling the clamping of the hairs, wherein the force adjusting component is configured to adjust the pressing force exerted by the pressing component in dependence on the relative distance detected by the skin proximity sensing component such that, when the relative distance detected by the skin proximity sensing component is a first relative distance, the movable hair-removal component operates in the non-functional mode and, when the relative distance detected by the skin proximity sensing component is a second relative distance smaller than the first relative distance, the movable hair-removal component operates in the functional mode.

7. The epilator according to claim 6, wherein the second value of the contact force is zero.

8. The epilator according to claim 6, wherein the pressing force exerted by the pressing component has a predefined maximum value;

wherein the force adjusting component is configured and arranged to reduce the pressing force exerted by the pressing component in the non-functional mode of the movable hair-removal component to a reduced value smaller than the predefined maximum value; and wherein the force adjusting component is configured and arranged to release the pressing component in the functional mode of the movable hair-removal component such that the pressing force exerted by the pressing component has the predefined maximum value.

9. The epilator according to claim 6, wherein the force adjusting component configured to adjust the pressing force exerted by the pressing component such that, when the relative distance detected by the skin proximity sensing component is above a predetermined threshold value, the movable hair-removal component operates in the non-functional mode and, when the relative distance detected by the skin proximity sensing component is below the predetermined threshold value, the movable hair-removal component operates in the functional mode.

10. The epilator according to claim 6, wherein the skin proximity sensing component comprises a mechanical contact sensor adapted to detect the relative distance by mechanical contact.

11. The epilator according to claim 10, wherein the mechanical contact sensor comprises a lever arrangement pivotably mounted relative to the hair-removal device, and the lever arrangement comprises:

a primary lever portion with a distal end configured and arranged to contact a skin portion during operation, the primary lever portion being arranged to touch the skin, during operation, and a secondary lever portion comprising a separating member;

wherein the primary and secondary lever portions are mutually coupled; and wherein the separating member is adapted to be displaced by rotation of the lever arrangement from a blocking position to a releasing position, wherein, in the blocking position, the separating member is arranged between the pressing component and the movable hair-removal component such that the separating member at least partially prevents transmission of the pressing force to the movable hair-removal component, and wherein, in the releasing position, the separating member releases the pressing component and the pressing component is adapted to transmit the pressing force to the movable hair-removal component.

12. The epilator according to claim 11, wherein the pressing component comprises a mechanical spring member, and in the blocking position of the separating member, the mechanical spring member exerts the pressing force on the separating member.

* * * * *